Figures 1, 2:
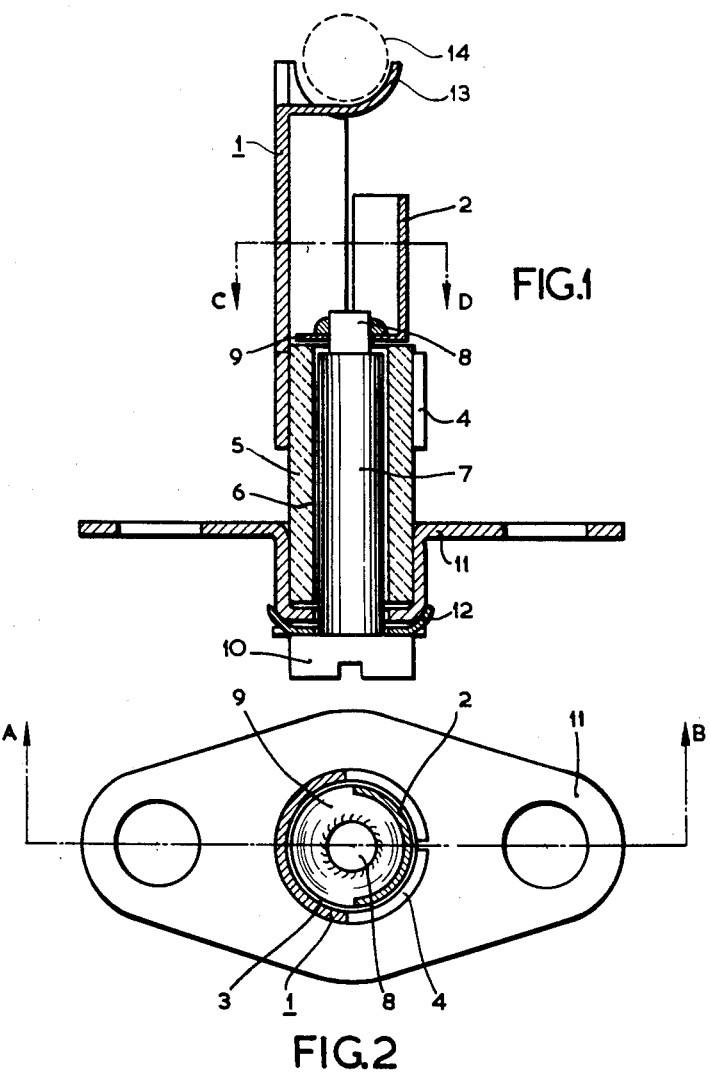

Dec. 4, 1962   R. ROGGON   3,067,369
COMBINATION OF A FIXED CAPACITOR AND A TRIMMER CAPACITOR
Filed May 27, 1959

INVENTOR
ROBERT ROGGON
BY
AGENT

United States Patent Office 3,067,369
Patented Dec. 4, 1962

3,067,369
COMBINATION OF A FIXED CAPACITOR AND A TRIMMER CAPACITOR
Robert Roggon, Krefeld, Germany, assignor to North American Philips Company, Inc., New York, N.Y., a corporation of Delaware
Filed May 27, 1959, Ser. No. 816,209
Claims priority, application Germany July 9, 1958
6 Claims. (Cl. 317—248)

This invention relates to a combination of a fixed capacitor, which is preferably used for temperature compensation of a resonant circuit and is provided with a dielectric which has a temperature-dependent dielectric constant, and of a trimmer or variable capacitor, between the stator and rotor electrodes of which provision is made of a dielectric having a temperature-independent dielectric constant, in particular air, while the rotor is electrically connected to a connecting wire.

It is known to compensate the variation with temperature of a resonant circuit or a coil or capacitor to zero value or to influence this variation to a desired extent by means of a capacitor having a temperature dependent capacitance value. If a resonant circuit includes a variable or trimmer capacitor which co-operates with the resonant circuit inductance, for example the inductance of a coil or a tank circuit, as the frequency determining element, and if furthermore another temperature dependent capacitance is used for temperature compensation of the inductance, the capacitance value of the variable or trimmer capacitor must remain substantially constant with variations in the temperature; hence, the dielectric of the trimmer capacitor must have a dielectric constant which is as independent of the temperature as possible, as is the case, for example, with air.

In the known arrangements of this kind, the trimmer capacitor and the fixed capacitor for the temperature compensation are two separate structures which must be connected to one another and to the inductance of the resonant circuit by means of leads of greater or lesser length. However, if the resonant circuit is intended for very short waves, for example for decimetre waves of frequencies higher than 200 mc./s., in which event the resonant circuit inductance preferably is a tank circuit, there must substantially be no connecting leads between the tank circuit and the trimmer and fixed capacitors, but these components, in particular the two capacitors, must be combined to form an integral structure without connecting leads. Thus, mounting of the combined components is also facilitated.

This problem occurs, for example, in a VHF-tuner for a television receiver, the tuning circuits of this tuner being tank circuits provided with capacitive tuning. For tuning, provision must be made of two trimmer capacitors, one for the upper and one for the lower frequency end of the frequency band to be covered. Temperature compensation of the tank circuit, at least for the oscillator circuit, must be effected by means of a fixed capacitor with temperature-dependent capacitance. Hence, the fixed capacitor must have a capacitance variation with temperature which counteracts the temperature deviation of the inductance of the tank circuit.

For this purpose, the present invention provides a suitable combination of a fixed capacitor and a trimmer capacitor of the above-described kind in that the dielectric of the fixed capacitor is interposed between a continuation of the stator and the current supply lead of the rotor of the trimmer capacitor, the said continuation and the current supply lead acting as electrodes of the fixed capacitor. This permits of combining in a simple manner the fixed capacitor and the trimmer capacitor to form a single structure which is convenient to manipulate.

If the dielectric of the fixed capacitor is shaped as a tube made preferably of ceramic material, according to a further feature of the invention, the current supply lead is passed through the bore of the tube while the continuation of the stator embraces the tube at least partially and is secured thereto; preferably the current supply lead at least substantially fills the sectional area of the bore of the tube.

Preferably the current supply lead simultaneously serves as a mechanical holder and/or adjusting member for the rotor and is mounted for rotation in the bore of the tube, one end of the lead being rigidly connected to the rotor, for example by soldering. This provides a very simple and inexpensive construction.

In order that the invention may readily be carried out, an embodiment thereof will now be described, by way of example, with reference to the accompanying diagrammatic drawings, in which FIG. 1 is a longitudinal sectional view of a combination in accordance with the invention and FIG. 2 is a cross-sectional view thereof taken on the line C—D.

In the embodiment shown, the trimmer capacitor comprises a semi-cylindrical stationary stator 1 of metal which cooperates with a metal rotor 2 likewise in the form of a semi-cylinder. When the rotor 2 is juxtaposed with the stator 1 to a maximum extent, there is an air gap 3 between them which constitutes the dielectric of the trimmer capacitor.

The stator 1 is provided with a continuation 4 which is bent to form a ring and slipped on to a tube 5 made of preferably ceramic material having a temperature-dependent dielectric constant, the ring and the tube being attached to one another, for example, by means of an adhesive or by soldering. A cylindrical metal rod 7 is passed through the bore 6 of the tube 5 and mounted for rotation therein. A projection 8 of reduced diameter of this rod extends through an aperture in a metal base disc 9 of the rotor 2. The base disc 9 and the projection being joined to each other electrically and mechanically, for example by soldering. The metal rod 7 substantially fills the entire sectional area of the bore 6 of the rod 5 and acts both as current supply lead and as mechanical holder and adjusting member for the rotor 2. For this purpose, the metal rod 7 is provided, at the end outwardly disposed with respect to the rotor electrode, with a screw head 10 while a metal support mounting 11 and a bronze spring washer 12 are interposed between the screw head and the tube 5. The spring washer 12 ensures a very satisfactory large-area contact between the screw head 10 of the metal rod 7 and the mounting holder 11, which must be connected to earth, and also ensures that the metal rod 7 and hence the rotor 2 are mounted in the tube 5 without play.

The portion of the metal rod 7 opposite the continuation 4 of the stator 1 acts as an electrode of a fixed capacitor of which the tube 5 is the dielectric; the counter electrode comprises the continuation 4 of the stator 1. Since the metal rod 7 has a circular cross-section, the capacitance of the fixed capacitor is not changed when the rod and hence the rotor electrode 2 are rotated. As has been mentioned hereinbefore, the dielectric constant of the dielectric of the tube 5 is temperature-dependent. A suitable choice of the dielectric material and of the capacitance value of the fixed capacitor enables the reactance variations in the resonant circuit produced by temperature variations to be compensated and the tuned frequency to be kept constant.

If the combination in accordance with the invention is to be used for very short waves, for example of frequencies higher than 200 mc./s., and is connected in parallel to a tank circuit having an inner conductor, preferably a lug-shaped strip 13 is bent from the stator 1 to serve to support and to secure a connecting lead 14, for example the inner conductor of the tank circuit. Thus, a separate connecting lead can be dispensed with so that the combination can be directly connected to the tank circuit without the introduction of inconvenient impedances.

What is claimed is:

1. In combination with a fixed capacitor, which is preferably used for temperature compensation of a resonant circuit and is provided with a dielectric having a temperature-dependent dielectric constant, a trimmer capacitor having a stator and rotor between which is interposed a dielectric having a temperature-independent dielectric constant, and in which said stator is electrically connected to a current supply lead; the combination characterized in that the temperature dependent dielectric of the fixed capacitor is interposed between a continuation of the stator of the trimmer capacitor, and a current supply rod, said rod being connected to the rotor of said trimmer capacitor, the said continuation of the trimmer stator and said current supply rod acting as electrodes of the fixed capacitor.

2. A combination as claimed in claim 1, in which the temperature-dependent dielectric of said fixed capacitor comprises a dielectric tube of ceramic material, and said current supply rod passes through the bore of said dielectric tube and substantially fills said bore, said continuation of the trimmer stator at least partly embracing said dielectric tube and being secured thereto.

3. A combination as claimed in claim 2, in which the current supply rod adjustably supports the rotor of said trimmer capacitor.

4. In combination with a fixed capacitor, which is preferably used for temperature compensation of a resonant circuit and is provided with a dielectric having a temperature-dependent dielectric constant, a trimmer capacitor having a stator and rotor between which is interposed a dielectric having a temperature-independent dielectric constant, and in which said stator is electrically connected to a current supply lead; the combination characterized in that the temperature dependent dielectric of the fixed capacitor is interposed between a continuation of the stator of the trimmer capacitor, and a current supply rod, the said continuation of the trimmer stator and said current supply rod acting as electrodes of the fixed capacitor, said fixed capacitor comprises a dielectric tube of ceramic material, and said current supply rod passes through the bore of said dielectric tube and substantially fills said bore, said continuation of the trimmer stator at least partly embracing said dielectric tube and being secured thereto, said current supply rod being rotatably mounted in the bore of said tube and is electrically and mechanically connected to one end to the rotor of said trimmer capacitor.

5. A combination as claimed in claim 4 in which said current supply rod is provided at the end more remote from the trimmer rotor with a head means, a spring washer and a mounting support interposed between said head means and the dielectric tube.

6. A combination as claimed in claim 5 in which a lug-shaped strip is bent from the trimmer stator and serves as a support for securing a connecting lead to said combined fixed and trimmer capacitors.

References Cited in the file of this patent

UNITED STATES PATENTS

| 2,028,596 | Franklin | Jan. 21, 1936 |
| 2,758,268 | Peyssou | Aug. 7, 1956 |

FOREIGN PATENTS

| 507,258 | Great Britain | June 13, 1939 |
| 511,042 | Great Britain | Aug. 9, 1939 |